United States Patent
Guest et al.

(10) Patent No.: US 9,488,027 B2
(45) Date of Patent: Nov. 8, 2016

(54) FIBER REINFORCED POLYMER MATRIX NANOCOMPOSITE DOWNHOLE MEMBER

(75) Inventors: Randall V. Guest, Spring, TX (US); Soma Chakraborty, Houston, TX (US); Joshua C. Falkner, Richmond, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 702 days.

(21) Appl. No.: 13/371,096

(22) Filed: Feb. 10, 2012

(65) Prior Publication Data

US 2013/0206273 A1  Aug. 15, 2013

(51) Int. Cl.
| | |
|---|---|
| *E21B 33/12* | (2006.01) |
| *E21B 33/134* | (2006.01) |
| *B82Y 30/00* | (2011.01) |
| *E21B 33/129* | (2006.01) |

(52) U.S. Cl.
CPC ............... *E21B 33/12* (2013.01); *B82Y 30/00* (2013.01); *E21B 33/1208* (2013.01); *E21B 33/1291* (2013.01); *E21B 33/134* (2013.01)

(58) Field of Classification Search
CPC ... E21B 33/134; E21B 33/12; E21B 33/1208
USPC .................. 166/192, 135, 193, 387
See application file for complete search history.

(56) References Cited

U.S. PATENT DOCUMENTS

| | | | |
|---|---|---|---|
| 6,708,768 B2 | 3/2004 | Slup et al. | |
| 6,708,770 B2 | 3/2004 | Slup et al. | |
| 7,151,129 B2 | 12/2006 | Ishikawa et al. | |
| 7,255,178 B2 | 8/2007 | Slup et al. | |
| 7,600,572 B2 | 10/2009 | Slup et al. | |
| 7,604,049 B2 * | 10/2009 | Vaidya et al. | ............. 166/244.1 |

(Continued)

FOREIGN PATENT DOCUMENTS

| | | |
|---|---|---|
| WO | 2007130979 A2 | 11/2007 |
| WO | WO2007130979 A2 | 11/2007 |

OTHER PUBLICATIONS

Emmanuel P. Giannelis, "Polymer-Layered Silicate Nanocomposites: Synthesis, Properties and Applications," Applied Organic Chemistry, 1998, pp. 675-680, vol. 12, John Wiley & Sons, Ltd., Cornell University, Ithaca, NY 14853, USA.

(Continued)

*Primary Examiner* — Nicole Coy
(74) *Attorney, Agent, or Firm* — Cantor Colburn LLP

(57) ABSTRACT

A downhole composite component is disclosed. The downhole composite component includes a tubular member, the tubular member comprising a fiber reinforced polymer matrix composite. The fiber reinforced polymer matrix composite includes a polymer matrix, the polymer matrix having an unfilled matrix compressive modulus of elasticity. The polymer matrix also includes a nanoparticle filler comprising a plurality of nanoparticles dispersed within the polymer matrix, the polymer matrix and dispersed nanoparticle filler having a filled matrix compressive modulus of elasticity, the filled matrix compressive modulus of elasticity being greater than the unfilled matrix compressive modulus of elasticity. The fiber reinforced polymer matrix composite also includes a plurality of reinforcing fibers, the plurality of reinforcing fibers embedded within the polymer matrix, the polymer matrix and plurality of reinforcing fibers having the form of the tubular member, the tubular member configured to receive a compressive stress.

28 Claims, 4 Drawing Sheets

(56) References Cited

U.S. PATENT DOCUMENTS

| | | |
|---|---|---|
| 8,535,604 B1 | 9/2013 | Baker et al. |
| 2002/0053284 A1 | 5/2002 | Koros et al. |
| 2002/0056369 A1 | 5/2002 | Koros et al. |
| 2005/0109502 A1* | 5/2005 | Buc Slay et al. ............ 166/179 |
| 2005/0119725 A1 | 6/2005 | Wang et al. |
| 2005/0149002 A1 | 7/2005 | Wang et al. |
| 2005/0149169 A1 | 7/2005 | Wang et al. |
| 2005/0161212 A1 | 7/2005 | Leismer et al. |
| 2005/0165471 A1 | 7/2005 | Wang et al. |
| 2005/0216075 A1 | 9/2005 | Wang et al. |
| 2006/0102871 A1 | 5/2006 | Wang |
| 2006/0118758 A1 | 6/2006 | Wang et al. |
| 2006/0219415 A1 | 10/2006 | Xu |
| 2006/0249705 A1 | 11/2006 | Wang et al. |
| 2007/0000682 A1 | 1/2007 | Varkey et al. |
| 2007/0045265 A1 | 3/2007 | McKinzie |
| 2007/0045266 A1 | 3/2007 | Sandberg et al. |
| 2007/0045267 A1 | 3/2007 | Vinegar et al. |
| 2007/0045268 A1 | 3/2007 | Vinegar et al. |
| 2007/0108200 A1 | 5/2007 | McKinzie et al. |
| 2007/0108201 A1 | 5/2007 | Vinegar et al. |
| 2007/0119098 A1 | 5/2007 | Diaz et al. |
| 2007/0133959 A1 | 6/2007 | Vinegar et al. |
| 2007/0133960 A1 | 6/2007 | Vinegar et al. |
| 2007/0133961 A1 | 6/2007 | Fairbanks et al. |
| 2007/0137856 A1 | 6/2007 | McKinzie et al. |
| 2007/0137857 A1 | 6/2007 | Vinegar et al. |
| 2007/0144732 A1 | 6/2007 | Kim et al. |
| 2007/0166541 A1 | 7/2007 | Smith et al. |
| 2007/0202318 A1 | 8/2007 | Smith et al. |
| 2008/0023205 A1 | 1/2008 | Craster et al. |
| 2008/0121436 A1 | 5/2008 | Slay et al. |
| 2008/0135245 A1 | 6/2008 | Smith et al. |
| 2008/0142223 A1 | 6/2008 | Xu et al. |
| 2008/0164037 A1 | 7/2008 | Hammami et al. |
| 2008/0179104 A1 | 7/2008 | Zhang et al. |
| 2008/0217321 A1 | 9/2008 | Vinegar et al. |
| 2008/0296020 A1 | 12/2008 | Willauer |
| 2008/0296023 A1 | 12/2008 | Willauer |
| 2009/0036605 A1 | 2/2009 | Ver Meer |
| 2009/0038797 A1 | 2/2009 | Skala et al. |
| 2009/0137433 A1 | 5/2009 | Smith et al. |
| 2009/0151949 A1 | 6/2009 | Marya et al. |
| 2009/0152009 A1 | 6/2009 | Slay et al. |
| 2009/0155578 A1 | 6/2009 | Zhamu et al. |
| 2009/0305044 A1 | 12/2009 | Bicerano et al. |
| 2010/0089578 A1 | 4/2010 | Nguyen et al. |
| 2010/0136316 A1 | 6/2010 | Kwag et al. |
| 2010/0156215 A1 | 6/2010 | Goertzen et al. |
| 2010/0181729 A1 | 7/2010 | Slay et al. |
| 2010/0227153 A1 | 9/2010 | Okoli et al. |
| 2011/0001086 A1 | 1/2011 | Kruckenberg et al. |
| 2011/0024103 A1 | 2/2011 | Storm et al. |
| 2011/0048741 A1 | 3/2011 | Durst |
| 2011/0053289 A1 | 3/2011 | Lowe et al. |
| 2011/0077176 A1 | 3/2011 | Smith |
| 2011/0092726 A1 | 4/2011 | Clarke |
| 2011/0120781 A1 | 5/2011 | Lockwood et al. |
| 2011/0124483 A1 | 5/2011 | Shah et al. |
| 2011/0168454 A1 | 7/2011 | Keshavan et al. |
| 2011/0170843 A1 | 7/2011 | Vinegar et al. |
| 2011/0171414 A1 | 7/2011 | Sreshta et al. |
| 2011/0186290 A1 | 8/2011 | Roddy et al. |
| 2011/0187556 A1 | 8/2011 | Roddy et al. |
| 2011/0192592 A1 | 8/2011 | Roddy et al. |
| 2011/0192593 A1 | 8/2011 | Roddy et al. |
| 2011/0192594 A1 | 8/2011 | Roddy et al. |
| 2011/0192597 A1 | 8/2011 | Roddy et al. |
| 2011/0192598 A1 | 8/2011 | Roddy et al. |
| 2011/0199228 A1 | 8/2011 | Roddy et al. |
| 2011/0209879 A1 | 9/2011 | Quigley et al. |
| 2011/0247669 A1 | 10/2011 | Gerrard |
| 2011/0253374 A1 | 10/2011 | Reyes et al. |
| 2011/0266058 A1 | 11/2011 | Kumar et al. |
| 2011/0278006 A1 | 11/2011 | Sanders et al. |
| 2011/0290476 A1 | 12/2011 | Steele et al. |
| 2011/0303413 A1 | 12/2011 | Fairbanks |
| 2012/0065309 A1 | 3/2012 | Agrawal et al. |
| 2012/0065311 A1 | 3/2012 | Chakraborty et al. |
| 2013/0263965 A1* | 10/2013 | Jones ................ E21B 17/00 138/174 |

OTHER PUBLICATIONS

Peter C. LeBron, Zhen Wang, Thomas J. Pinnavaia, "Polymer-Layered Silicate Nanocomposites: An Overview," Applied Clay Science, Apr. 12, 1999, pp. 11-29, vol. 15, Elseiver Science B.V. PII, Michigan State University, East Lansing, MI 48824, USA.

Adebhar, T. et al. Reinforcing nanoparticles in reactive resins. European Coatings Journal, 2001, 4, pp. 144-149.

Budiansky, B. et al. Compressive kinking of fiber composites: A topical review. Journal of Applied Mechanics, vol. 47, No. 6, part 2, Jun. 1994.

Fleck, N.A. et al. Prediction of Kink Width in Compressed Fiber Composites. Copyright 1995 by ASME. J. Appl. Mech., vol. 62, Jun. 1995, pp. 329-337.

Hanse chemie. Perspectives of chemical nanotechnology. Oct. 1, 2001.

Mao, Dongsheng. Improving Mechanical Properties of Nanocomposites Using Carbon Nanotubes. Copyright 2009 by Applied Nanotech, Inc. Published by Society for the Advancement of Material and Process Engineering with permission.

Tzeng, Shinn-Shyong et al. Mechanical Properties of Carbon-Carbon Composites Reinforced with Carbon Nanotubes or Carbon Nanofibers. 16th International Conference on Composite Materials, Jul. 8-13, 2007.

Waas, A. M. et al. A Mechanical Model for Elastic Fiber Microbuckling. J. Appl. Mech., vol. 57, Mar. 1990, pp. 138-147.

* cited by examiner

US 9,488,027 B2

FIBER REINFORCED POLYMER MATRIX NANOCOMPOSITE DOWNHOLE MEMBER

BACKGROUND

A downhole environment such as, for example, an oil or gas well in an oilfield or undersea environment, a geothermal borehole, a carbon dioxide sequestration hole, and other such downhole environments encountered, may expose equipment used in these environments during well drilling, completion and production operations to severe conditions of temperature, pressure, or corrosiveness. For example, downhole tools or components such as bridge plugs, frac plugs and various measurement and logging devices incorporate various tubular members that are exposed to severe axial or radial compressive stresses, or both.

While the use of lightweight materials, including various composite materials, is generally desirable in these downhole environments, and particularly for use with the downhole tools and components mentioned, particularly various tubular members of these tools and components, their use has been limited in some cases by the compressive strength obtainable with existing composite materials and other factors. Therefore, the development of improved composite materials having improved mechanical and material properties, particularly improved compressive strength, is very desirable.

SUMMARY

In an exemplary embodiment, a downhole composite component is disclosed. The downhole composite component includes a tubular member, the tubular member comprising a fiber reinforced polymer matrix composite. The fiber reinforced polymer matrix composite includes a polymer matrix, the polymer matrix having an unfilled matrix compressive modulus of elasticity. The polymer matrix also includes a nanoparticle filler comprising a plurality of nanoparticles dispersed within the polymer matrix, the polymer matrix and dispersed nanoparticle filler having a filled matrix compressive modulus of elasticity, the filled matrix compressive modulus of elasticity being greater than the unfilled matrix compressive modulus of elasticity. The fiber reinforced polymer matrix composite also includes a plurality of reinforcing fibers, the plurality of reinforcing fibers embedded within the polymer matrix, the polymer matrix and plurality of reinforcing fibers having the form of the tubular member, the tubular member configured to receive a compressive stress.

BRIEF DESCRIPTION OF THE DRAWINGS

Referring now to the drawings wherein like elements are numbered alike in the several Figures.

DETAILED DESCRIPTION

Figure 1:
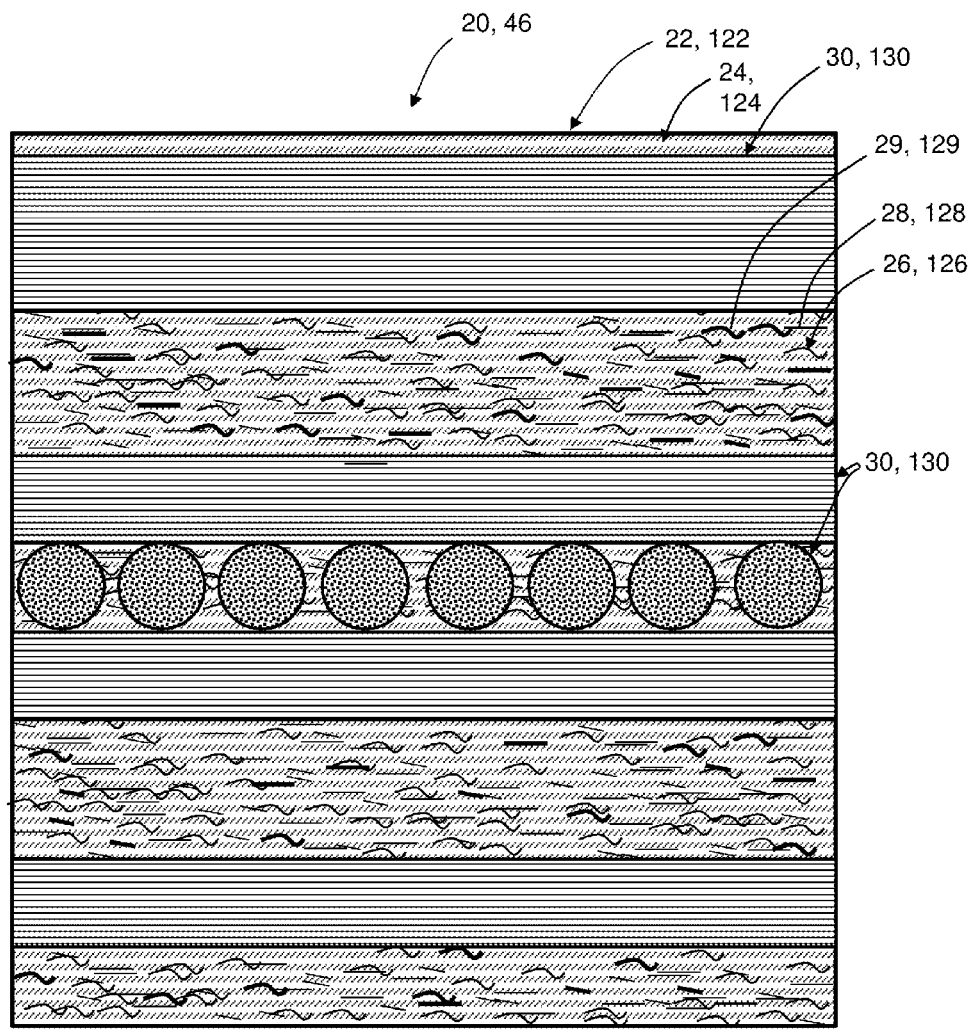
FIG. 1 is a schematic cross-sectional view of an exemplary embodiment of a fiber reinforced polymer matrix composite as disclosed herein.

A composite downhole structure for use in challenging downhole environments encountered during well drilling, completion and production operations that include severe conditions of temperature, pressure or corrosiveness is disclosed. The composite structure includes a tubular member. The tubular member includes a fiber reinforced polymer matrix composite. The polymer matrix includes a polymer, such as a thermoset resin or thermoplastic, and nanoparticle matrix enhancers. Surprisingly, it has been found that inclusion of a nanoparticle in the polymer matrix provides improved mechanical properties, particularly the elastic modulus and shear modulus and compressive strength, without substantially reducing tensile strength, relative to the polymer matrix unmodified with a nanoparticle. Further, it has surprisingly been found that inclusion of a nanoparticle, derivatized to include a functional group such as a hydroxy, carboxy, epoxy, or other functional group, in the polymer matrix provides a further improvement in mechanical properties, particularly the elastic modulus in compression and flexural modulus and compressive strength, relative to the polymer matrix unmodified with a derivatized nanoparticle, or to the polymer matrix modified with an non-derivatized nanoparticle. Furthermore, it has also surprisingly been found that the variability in mechanical properties, including those mentioned above, is significantly reduced when a derivatized nanoparticle is included in the composite, when compared with inclusion of an non-derivatized nanoparticle. It has surprisingly been found that the polymer matrix and nanoparticle matrix enhancers work together synergistically with macroscale fiber reinforcement, whereby the resin elastic and shear moduli are increased, allowing the fiber component of the composite to carry more compressive load, thereby increasing the capability of the structure in hot, wet downhole environments, relative to the capacity of the fiber to carry compressive load in the un-enhanced matrix. More particularly, the compressive strength and bending strength are increased by the increased elastic and shear moduli. The result is downhole composite structures, particularly downhole composite tubular members, particularly those designed for use in extreme environments that are exposed to corrosive wellbore fluids, high temperatures and high compressive loads that have enhanced compressive strength and hence have enhanced working pressure ranges and the ability to operate in extreme downhole environments where the use of fiber reinforced polymer matrix composites has not been possible.

Referring to the figures, and more particularly, to FIGS. 1-5 a downhole composite component 10 for use in a wellbore 12 in an earth formation 14 is disclosed. This may include any suitable downhole composite component 10; however, the downhole composite components 10 described herein are particularly well-suited for applications where the components are subject to downhole compressive stresses. In one embodiment, the downhole composite component 10 includes a tubular member 20 that comprises a fiber reinforced polymer matrix composite 22 or composite material as illustrated generally in FIG. 1. The fiber reinforced polymer matrix composite 22 of FIG. 1 includes a polymer matrix 24, a nanoparticle filler 26 that includes a plurality of nanoparticles 28 and a plurality of reinforcing fibers 30. The tubular member 20 may have various configurations or forms depending on the downhole tool or component into which it is incorporated. Suitable downhole composite components 10 that include tubular members 22 include a bridge plug 40, frac plug 60 or various tubular or partially tubular portions, such as a cover 80, used with a wide variety of downhole tools and components.

Figure 2:
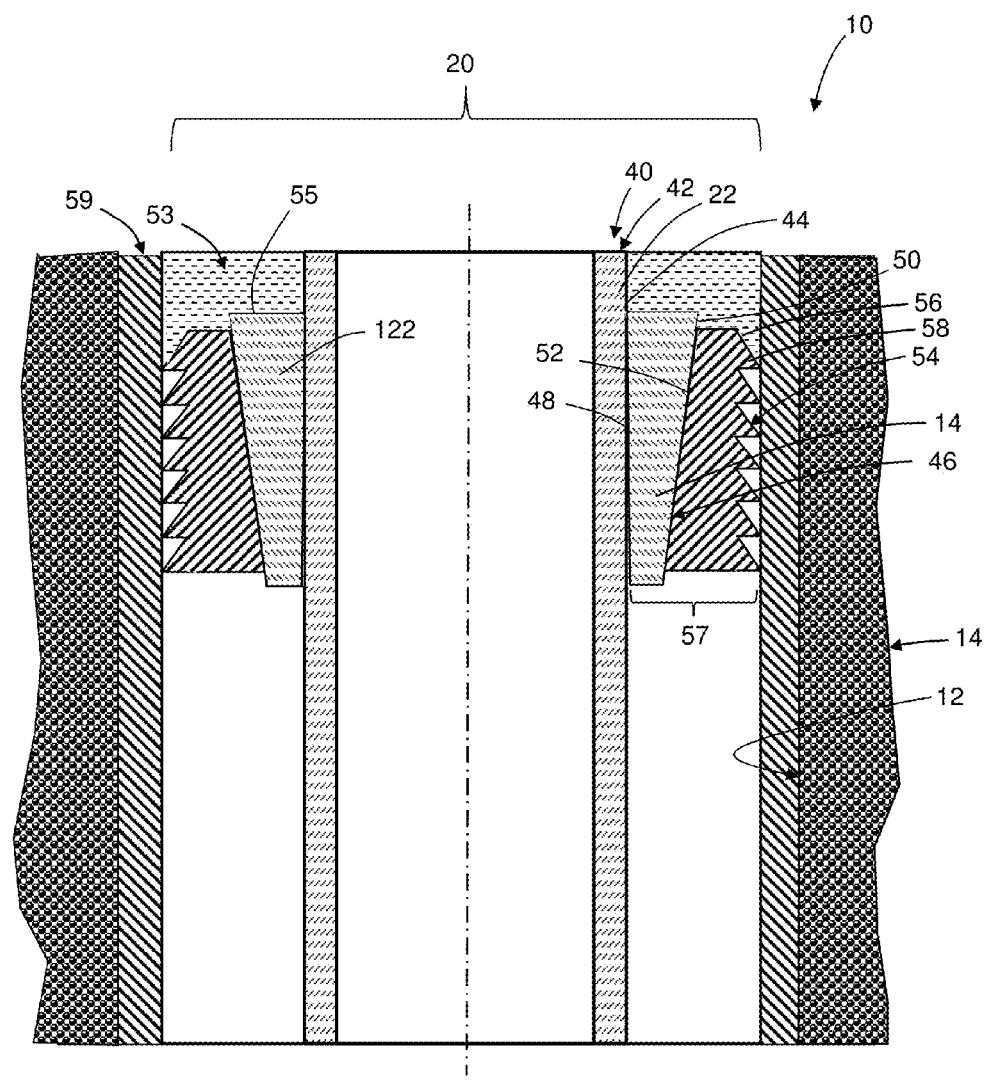
FIG. 2 is a schematic cross-sectional view of an exemplary embodiment of a fiber reinforced polymer matrix composite tubular member as disclosed herein comprising a bridge plug.

In one embodiment, as illustrated in FIGS. 1 and 2, the tubular member 20 includes a hollow cylindrical mandrel 42 of a bridge plug 40. The mandrel 42 has an outer cylindrical surface 44 that is configured to slidably receive a tapered cone 46. The tapered cone 46 includes an inner cylindrical surface 48 that is configured for sealable sliding engagement on the outer surface 44 of the mandrel 42. The tapered cone 46 also has a tapered outer surface 50. The tapered outer surface 50 is configured to slidably receive the complementary tapered inner surface 52 of a slip 54. The slip 54 includes a complementary tapered inner surface 52 that is configured for sealable sliding engagement on the tapered outer surface 50 of the cone 46 and a substantially cylindrical outer surface 56. The outer surface 56 includes a plurality of circumferentially extending tapered teeth 58 that are configured to grip and sealably engage an inner surface of a tubular casing 59, such as a wellbore casing. The tapered cone 46 and slip 54 and their engaged surfaces are configured to provide a seal 57 between the outer surface 44 of the mandrel 42 and the inner surface of the casing 59 upon actuation of the bridge plug by application of pressure, such as hydrostatic pressure of a suitable wellbore fluid 53 to a pressure actuation end 55 of the cone 46 causing sliding axial movement of the tapered cone 46 wedging the cone between the slip 54 and mandrel 40 and actuation of the bridge plug 40. Upon actuation of the bridge plug 40, the mandrel 42, tapered cone 46 and slip 54 are configured to receive axial and radial compressive stresses. The use of the fiber reinforced polymer matrix composite 22 having the nanoparticle filler 26 in the polymer matrix 24, as described herein, provides an ultimate compressive stress of the fiber reinforced polymer matrix composite 22 that is greater than the same fiber reinforced polymer matrix composite without the nanoparticle filler 26. In this embodiment, due to the fact that the mandrel 42 is formed from the fiber reinforced polymer matrix composite 22, the mandrel 42 is able to be used at higher pressures than would otherwise be possible without the use of nanoparticle filler 26, thereby enabling the use higher fracturing pressures than would otherwise be available when using a conventional mandrel, including a conventional composite mandrel that does not incorporate nanoparticle fillers 26 as described herein.

Referring again to FIGS. 1 and 2, in another embodiment the tapered cone 46 may also include a second fiber reinforced polymer matrix composite 122. The second fiber reinforced polymer matrix composite 122 may be the same as the first fiber reinforced polymer matrix composite 22 and have the same constituent components, or may be a different composite material having different constituent components. The second fiber reinforced polymer matrix composite 122 includes a cone polymer matrix 124, which may be formed using the same materials as described herein for polymer matrix 24. The cone polymer matrix 124 has an unfilled matrix compressive modulus of elasticity. The second fiber reinforced polymer matrix composite 122 also includes a cone nanoparticle filler 126 comprising a plurality of nanoparticles dispersed within the cone polymer matrix 124, which may be formed using the same materials as described herein for the nanoparticle filler 26. The cone polymer matrix 124 and dispersed cone nanoparticle filler 126 have a filled matrix compressive modulus of elasticity, and the filled matrix compressive modulus of elasticity is greater than the unfilled matrix compressive modulus of elasticity. The second fiber reinforced polymer matrix composite 122 also includes a plurality of cone reinforcing fibers 130, which may be formed using the same materials as described herein for the reinforcing fibers 30. The cone polymer matrix 124 and plurality of cone reinforcing fibers 130 have the form of the cone 46 described herein. The ultimate compressive stress of the second fiber reinforced polymer matrix composite 122 with the cone nanoparticle filler 126 is greater than the same fiber reinforced polymer matrix composite without the filler.

Figure 3:
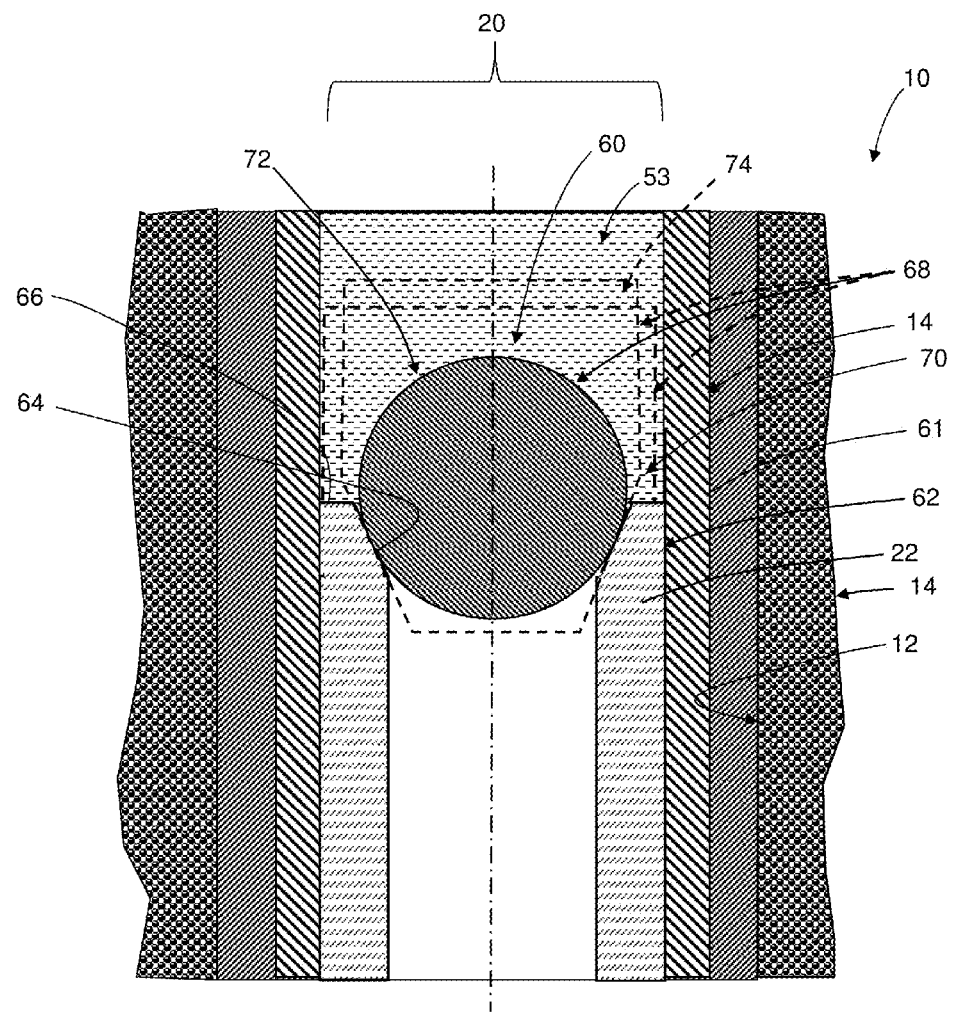
FIG. 3 is a schematic cross-sectional view of a second exemplary embodiment of a fiber reinforced polymer matrix composite tubular member as disclosed herein comprising a frac plug.

In yet another embodiment, as illustrated in FIG. 3, the tubular member 20 may include a hollow cylindrical mandrel 62 of a frac plug 60 disposed with a casing 61. The mandrel has a plug seat 64 proximate an end of the mandrel 62 to provide sealing engagement with a complementary plug member 68 upon actuation by application of pressure, such as hydrostatic pressure of a suitable wellbore fluid (not shown). The plug seat may be disposed on the end 66, such as may be used with cylindrical plug 70 as plug member 68 as shown in phantom that is configured to be seated on the end 66, or alternately may include a tapered plug seat 64 disposed on an inner surface 70 of the mandrel 60 proximate the end 66, such as may be used with a suitable spherical ball 72 or frustoconical dart 74 shown in phantom as plug member 68. The plug seat 64 and mandrel 62 are configured for sealable engagement with a plug member 68 upon actuation of the frac plug 60. Upon actuation of the frac plug 60, the mandrel 62 and plug member 68 are configured to receive axial or radial compressive stresses, or both. Again, the use of the fiber reinforced polymer matrix composite 22 having the nanoparticle filler 26 in the polymer matrix 24, as described herein, provides an ultimate compressive stress of the fiber reinforced polymer matrix composite 22 that is greater than the same fiber reinforced polymer matrix composite without the nanoparticle filler 26. In this embodiment, due to the fact that the mandrel 62 is formed from the fiber reinforced polymer matrix composite 22, the mandrel 62 is able to be used at higher pressures than would otherwise be possible without the use of nanoparticle filler 26, thereby enabling the use higher fracturing pressures than would otherwise be available when using a conventional mandrel, including a conventional composite mandrel that does not incorporate nanoparticle fillers 26 as described herein.

Figure 4:
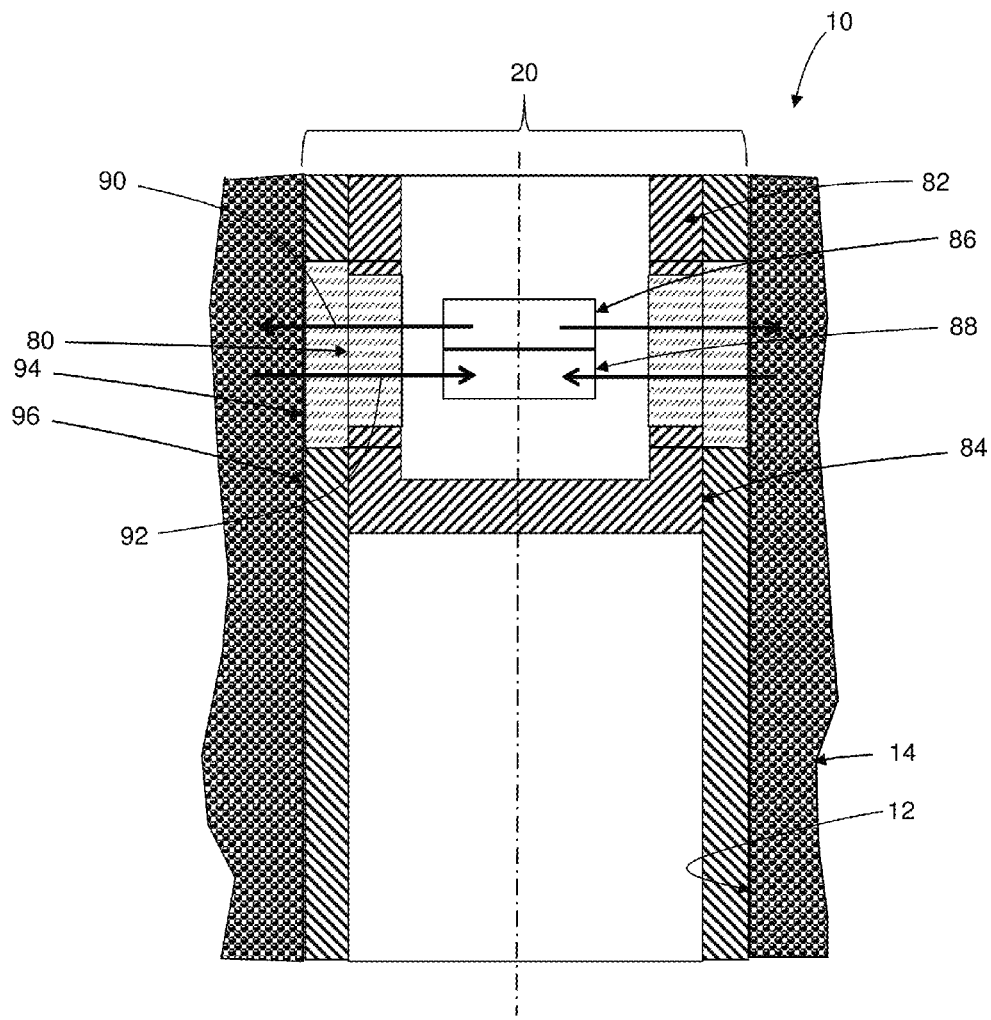
FIG. 4 is a schematic cross-sectional view of an exemplary embodiment of a fiber reinforced polymer matrix composite tubular member as disclosed herein comprising a tubular cover and tubular section.
Figure 5:
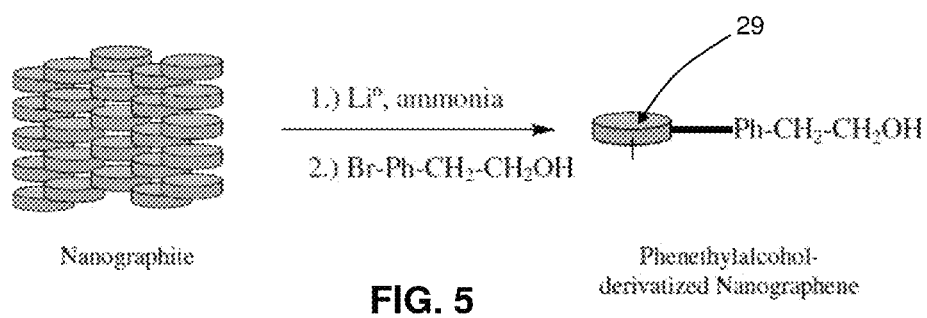
FIG. 5 is a schematic illustration of a reaction scheme for derivatizing graphene nanoparticles.

In yet another embodiment, as illustrated in FIG. 4, the tubular member 20 formed from fiber reinforced polymer matrix composite 22 may include a cylindrical or tubular section 80 or cover that is configured to comprise a portion of a tubular housing 82 and configured to facilitate operation of an axially movable downhole tool 84 or component. In one example, the tubular section 80 comprises a tubular portion of a housing 82 and may surround a downhole tool or component 84, such as a portion of a bottom hole assembly (BHA). A BHA generally includes various devices, including a various formation instruments 86 and sensors 88, for example, for determining various parameters of the BHA, or the earth formation surrounding the BHA, during the drilling of the wellbore 12. Such devices are often referred to as measurement-while-drilling (MWD) devices or logging-while-drilling (LWD) devices. The cylindrical section 80 may extend over an axial section or just a portion of a tubular housing 82, such as to provide a cover for an MWD or LWD device where a non-metallic material is needed as a cover 80 in order to avoid interference with or obstruction of signals into 90 or from 92 the surrounding casing 12 or earth formation 14 or another aspect of the downhole environment, for example. Cylindrical cover 80 may have any suitable shape or form, including full or partial cylindrical sections. Further, cylindrical cover 80 may have any shape, including various flat, convex, concave or other curved planar shape, so long as it is adapted for use in a downhole tool or component, particularly various tubular members 20. In another embodiment, tubular member 20 of fiber reinforced polymer matrix composite 22 may include a cylindrical or tubular section 94 of a downhole tubular member, such as a casing 96 disposed within the wellbore 12, which may also be used, for example, in conjunction with various downhole tools or components 84 in order to avoid interference with or obstruction of signals into 90 or from 92 the surrounding casing 12 or earth formation 14 or another aspect of the downhole environment as described herein, for example.

Referring again to FIG. 1, the fiber reinforced polymer matrix composite 22 includes a polymer matrix 24, a nanoparticle filler 26 that includes a plurality of nanoparticles 28 and a plurality of reinforcing fibers 30. The polymer matrix 24 may include any suitable polymer material including various thermoset and thermoplastic polymers. In one embodiment, polymer matrix 24 is a thermoset polymer, and more particularly includes a phenolic, epoxy or bismaleimide polymer, or a combination thereof. In another embodiment, polymer matrix 24 is a thermoplastic polymer, and more particularly includes a polyetheretherketone (PEEK) polymer. Phenolic resins include, for example, those prepared from phenol, resorcinol, o-, m- and p-xylenol, o-, m-, or p-cresol, and the like, and aldehydes such as formaldehyde, acetaldehyde, propionaldehyde, butyraldehyde, hexanal, octanal, dodecanal, benzaldehyde, salicylaldehyde, where exemplary phenolic resins include phenol-formaldehyde resins. Epoxy resins include, for example, those prepared from bisphenol A diepoxide. The polymer matrix 24 has an unfilled matrix compressive modulus of elasticity prior to the incorporation of the nanoparticle filler 26.

The nanoparticle filler 26 includes a plurality of nanoparticles 28 dispersed within the polymer matrix 24. Nanoparticles are generally particles having an average particle size, in at least one dimension, of less than one micrometer (μm). As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. Nanoparticles may include both particles having an average particle size of 250 nm or less, and particles having an average particle size of greater than 250 nm to less than 1 μm (sometimes referred in the art as "sub-micron sized" particles). In an embodiment, a nanoparticle may have an average particle size of about 0.01 to about 500 nanometers (nm), specifically 0.05 to 250 nm, more specifically about 0.1 to about 150 nm, more specifically about 0.5 to about 125 nm, and still more specifically about 1 to about 75 nm. The nanoparticles may be monodisperse, where all particles are of the same size with little variation, or polydisperse, where the particles have a range of sizes and are averaged. Generally, polydisperse nanoparticles are used. Nanoparticles of different average particle size may be used, and in this way, the particle size distribution of the nanoparticles may be unimodal (exhibiting a single distribution), bimodal exhibiting two distributions, or multi-modal, exhibiting more than one particle size distribution. The nanoparticles may have a high surface area of greater than about 300 m$^2$/g, and more particularly, about 300 m$^2$/g to about 1800 m$^2$/g, and even more particularly about 500 m$^2$/g to about 1500 m$^2$/g.

The nanoparticle filler 26 may include any suitable nanoparticle filler. In one embodiment, the nanoparticle filler 26 may include a plurality of graphene, nanotube, fullerene, graphite, graphene fiber, nanodiamond, silica, clay, mineral, metal or polyhedral oligomeric silsesquioxane nanoparticles, or a combination thereof.

In one embodiment, the nanotubes may include single or multiwall carbon, inorganic or metallated nanotubes, or a combination thereof. Carbon nanotubes are tubular fullerene structures having open or closed ends and which may be inorganic or made entirely or partially of carbon, and may include also components such as metals or metalloids.

In another embodiment, the nanoparticles comprise graphene including graphene nanoparticles and graphene fibers (i.e., graphene particles having an average largest dimension of greater than 1 mm and an aspect ratio of greater than 10, where the graphene particles form an interbonded chain). Graphene and graphene nanoparticles, as disclosed herein, are effectively two-dimensional particles of nominal thickness, having of one or more layers of fused hexagonal rings with an extended delocalized π-electron system, layered and weakly bonded to one another through π-π stacking interaction. Graphene in general, and including graphene nanoparticles, may be a single sheet or a stack of several sheets having both micro- and nano-scale dimensions, such as in some embodiments an average particle size of 1 to 20 μm, specifically 1 to 15 μm, and an average thickness (smallest) dimension in nano-scale dimensions of less than or equal to 50 nm, specifically less than or equal to 25 nm, and more specifically less than or equal to 10 nm. An exemplary graphene nanoparticle may have an average particle size of 1 to 5 μm, and specifically 2 to 4 μm. In addition, smaller nanoparticles or sub-micron sized particles as defined above may be combined with nanoparticles having an average particle size of greater than or equal to 1 μm. In a specific embodiment, the derivatized nanoparticle is a derivatized graphene nanoparticle.

Graphene, including graphene nanoparticles, may be prepared by exfoliation of graphite nanoparticles or by a synthetic procedure by "unzipping" a nanotube to form a graphene nanoparticles ribbon, followed by derivatization of the graphene nanoparticles to prepare, for example, a graphene nanoparticle oxide. The exfoliated graphite nanoparticles may provide the graphene nanoparticles as a single sheet only one molecule thick, or as a layered stack of relatively few sheets. In an embodiment, an exfoliated graphene nanoparticle has fewer than 50 single sheet layers, particularly fewer than 20 single sheet layers, specifically fewer than 10 single sheet layers, and more particularly fewer than 5 single sheet layers.

In yet another embodiment, the nanoparticles 28 may include POSS, also referred to as polysilsesquioxanes and polyorganosilsesquioxanes. POSS or polyhedral oligomeric silsesquioxanes (POSS) derivatives are polyorganosilicon oxide compounds of general formula $RSiO_{1.5}$ (where R is an organic group such as methyl) having defined closed or open cage structures (closo or nido structures).

Fullerenes, as disclosed herein, may include any of the known cage-like hollow allotropic forms of carbon possessing a polyhedral structure. Fullerenes may include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes may include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanographite is a cluster of plate-like sheets of graphite, in which a stacked structure of one or more layers of graphite, which has a plate-like two dimensional structure of fused hexagonal rings with an extended delocalized π-electron system, are layered and weakly bonded to one another through π-π stacking interaction. Nanographite has both micro- and nano-scale. dimensions, such as for example an average particle size of 1 to 20 μm, specifically 1 to 15 μm, and an average thickness (smallest) dimension in nano-scale dimensions, and an average thickness of less than 1 μm, specifically less than or equal to 700 nm, and still more specifically less than or equal to 500 nm.

Nanoclays may be used as the nanoparticles 28. Nanoclays may be hydrated or anhydrous silicate minerals with a layered structure and may include, for example, aluminosilicate clays such as kaolins including hallyosite, smectites including montmorillonite, illite, and the like. Exemplary nanoclays include those marketed under the tradename CLOISITE® marketed by Southern Clay Additives, Inc. Nanoclays may be exfoliated to separate individual sheets, or may be non-exfoliated, and further, may be dehydrated or included as hydrated minerals. Other nano-sized mineral fillers of similar structure may also be included such as, for example, talc, micas including muscovite, phlogopite, or phengite, or the like.

Inorganic nanoparticles may also be use as nanoparticles 28. Exemplary inorganic nanoparticles may include a metal or metalloid carbide such as tungsten carbide, silicon carbide, boron carbide, or the like; a metal or metalloid nitride such as titanium nitride, boron nitride, silicon nitride, or the like; and/or a metal nanoparticle such as iron, tin, titanium, platinum, palladium, cobalt, nickel, vanadium, alloys thereof, or a combination comprising at least one of the foregoing.

The nanoparticles 28 may optionally include derivatized nanoparticles 29 that are derivatized to include one or more functional groups, functionalized polymeric or oligomeric group, or a combination thereof. In one embodiment, the functional group may include a carboxy, epoxy, ether, ketone, amine, hydroxy, alkoxy, alkyl, aryl, aralkyl, alkaryl or lactone functional group, or a functionalized polymeric or oligomeric group, or a combination thereof. The nanoparticles 28 may include non-derivatized nanoparticles or may comprise derivatized nanoparticles 29, or may be a combination of non-derivatized nanoparticles and derivatized nanoparticles 29. In one embodiment, the derivatized nanoparticles 29 include derivatized graphene nanoparticles, and the functional group comprises an alkyl, aryl, aralkyl, alkaryl, functionalized polymeric or oligomeric groups, or a combination thereof, and the functional groups are attached directly to the derivatized nanoparticle 29 by a carbon-carbon bond without intervening heteroatoms; a carbon-oxygen bond; or a carbon-nitrogen bond.

The nanoparticles 28 may include elongated nanoparticles of various types, and more particularly may include nanoparticles 28 that have an aspect ratio of the nanoparticles of about 0.001 to about 200. The nanoparticles 28, including derivatized nanoparticles 29, of the nanoparticle filler 26 may be incorporated into the polymer matrix 24 in any suitable amount, and more particularly may be incorporated in an amount, by volume fraction of the polymer matrix, of about 0.0005 to about 0.15, and more particularly about 0.05. The polymer matrix 24 and dispersed nanoparticle filler 26 have a filled matrix compressive modulus of elasticity that is greater than the unfilled matrix compressive modulus of elasticity. The nanoparticle filler 26 may be dispersed throughout the polymer matrix 24 in any suitable manner. In one embodiment, the nanoparticles 28 of the nanoparticle filler 26 may be dispersed homogeneously throughout the polymer matrix 24. In another embodiment, the nanoparticles 28 of the nanoparticle filler 26 may be dispersed non-homogeneously throughout the polymer matrix 24 in various heterogeneous dispersions. As an example, the loading (e.g., volume percent) of the nanoparticle filler 26 in the polymer matrix 24 in one portion of a tubular member 20 may be different than in another portion of the member, such as to increase the strength of the composite locally within a given member.

The plurality of reinforcing fibers 30 are embedded within the polymer matrix 24. The polymer matrix 24 and plurality of reinforcing fibers 30 provide and define the form of the tubular member 20. Any suitable reinforcing fibers 30 may be utilized to form tubular member 20. In one embodiment, the plurality of reinforcing fibers 30 may include glass, carbon, mineral, ceramic, metal or polymer fibers, or a combination thereof. Glass fibers may include various silicate and non-silicate glass fibers, including quartz fibers. Polymer fibers may include various aramid fibers, for example. Mineral fibers may include basalt fibers, for example. Ceramic fibers may include $\alpha$-$Al_2O_3$, $\alpha$-$Al_2O_3$/$SiO_2$, and others. Metal fibers may include Boron and $\alpha$-Fe single crystal whiskers. The plurality of reinforcing fibers 30 may be continuous of any suitable length or discontinuous; including various types of chopped fiber, and may include mixtures of both continuous and discontinuous fibers. They may have any suitable fiber cross-sectional shape and size and may be present in the same or different shapes and sizes. In one embodiment, the plurality of reinforcing fibers 30 may have a circular cross-section and a diameter of about 5 to about 25 microns, or up to 150 microns, depending on the fiber. The plurality of reinforcing fibers 30 may be present in any suitable amount. In one embodiment, the plurality of reinforcing fibers are present in an amount, by volume fraction of the composite, of about 0.2 to about 0.8, and more particularly about 0.3 to about 0.5, and even more particularly about 0.6. The plurality of reinforcing fibers 30 may be present in any suitable form, including as individual filaments or in various multi-filament or consolidated forms, including various yarns, strands, tows or rovings. These may be embedded in various ordered or disordered forms, including randomly. They may be formed into various types of cloth or fabric, including all manner of woven and non-woven cloth, including various felts and mats formed from chopped or continuous fibers, for example. Examples of the various forms include mats (e.g., nonwoven fabrics made from fibers that are held together by a chemical binder, including chopped and continuous strand), woven fabric (e.g., made on looms in a variety of weights, weaves and widths), hybrid fabrics (e.g., those constructed with varying fiber types, strand compositions and fabric types, such as by stitching woven fabric and nonwoven mat together), multi-axials (e.g., nonwoven fabrics made with unidirectional fiber layers stacked in different orientations and held together by through-the-thickness stitching, knitting or a chemical binder), braided fabrics (e.g., continuously woven on the bias and have at least one axial yarn that is not crimped in the weaving process), preforms (e.g., near-net shape reinforcement forms designed for use in the manufacture of particular parts by stacking and shaping layers of chopped, unidirectional, woven, stitched and/or braided fiber into a predetermined three-dimensional form) and prepregs (e.g., resin-impregnated fiber preforms manufactured by impregnating fibers with a controlled amount of resin (thermoset or thermoplastic), using solvent, hot-melt or powder-impregnation technologies). The various fiber forms may be combined in any manner, including as a series of radially-spaced plies or layers, such as a first ply 32, second ply 34, third ply 36, etc. These plies may be formed from any of the fiber forms described herein as a ply in any combination.

In one embodiment, the plurality of reinforcing fibers 30 comprises a cloth, including a woven cloth, and the cloth comprises a plurality of circumferentially wrapped cloth plies or layers. In another embodiment, the plurality of reinforcing fibers comprise a yarn, tow, roving or other consolidated form, and the yarn, tow, roving or other consolidated form comprises a circumferentially oriented tow, roving or other consolidated form as one ply and a non-circumferentially oriented yarn, tow, roving or other consolidated form as a second ply. The non-circumferentially oriented yarn, tow, roving or other consolidated form may be oriented axially or at an acute angle to a longitudinal axis 21 of the tubular member 20. In yet another embodiment, the plurality of reinforcing fibers comprise a yarn, tow, roving or other consolidated form as one ply, and a cloth as a second ply. In still another embodiment, the plurality of reinforcing fibers may include randomly oriented fibers. As indicated, the various fiber forms and layer arrangements in the embodiments described above may be used for the tubular member 20, including the mandrel 42 and cone 46.

As note, the nanoparticles 28 used herein may be derivatized to form derivatized nanoparticles to include functional groups such as, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, or a combination comprising at least one of the forgoing functional groups. The nanoparticles 28, including graphene nanoparticles after exfoliation, are derivatized to introduce chemical functionality to the nanoparticle. For example, for graphene nanoparticles, the surface and/or edges of the graphene nanoparticles sheet is derivatized to increase dispersibility in and interaction with the polymer matrix. In an embodiment, the derivatized nanoparticle may be hydrophilic, hydrophobic, oxophilic, lipophilic, or may possess a combination of these properties to provide a balance of desirable net properties, by use of different functional groups.

In an embodiment, the nanoparticle is derivatized by, for example, amination to include amine groups, where amination may be accomplished by nitration followed by reduction, or by nucleophilic substitution of a leaving group by an amine, substituted amine, or protected amine, followed by deprotection as necessary. In another embodiment, the graphene nanoparticles can be derivatized by oxidative methods to produce an epoxy, hydroxy group or glycol group using a peroxide, or by cleavage of a double bond by for example a metal mediated oxidation such as a permanganate oxidation to form ketone, aldehyde, or carboxylic acid functional groups.

Where the functional groups are alkyl, aryl, aralkyl, alkaryl, functionalized polymeric or oligomeric groups, or a combination of these groups, the functional groups may be attached directly to the derivatized nanoparticle by a carbon-carbon bond without intervening heteroatoms, to provide greater thermal and/or chemical stability, to the derivatized nanoparticle, as well as a more efficient synthetic process requiring fewer steps; by a carbon-oxygen bond (where the nanoparticle contains an oxygen-containing functional group such as hydroxy or carboxylic acid); or by a carbon-nitrogen bond (where the nanoparticle contains a nitrogen-containing functional group such as amine or amide). In an embodiment, the nanoparticle can be derivatized by metal mediated reaction with a $C_{6-30}$ aryl or $C_{7-30}$ aralkyl halide (F, Cl, Br, I) in a carbon-carbon bond forming step, such as by a palladium-mediated reaction such as the Stille reaction, Suzuki coupling, or diazo coupling, or by an organocopper coupling reaction. In another embodiment, a nanoparticle, such as a fullerene, nanotube, nanodiamond, or graphene nanoparticles, may be directly metallated by reaction with e.g., an alkali metal such as lithium, sodium, or potassium, followed by reaction with a $C_{1-30}$ alkyl or $C_{7-30}$ alkaryl compound with a leaving group such as a halide (Cl, Br, I) or other leaving group (e.g., tosylate, mesylate, etc.) in a carbon-carbon bond forming step. The aryl or aralkyl halide, or the alkyl or alkaryl compound, may be substituted with a functional group such as hydroxy, carboxy, ether, or the like. Exemplary groups include, for example, hydroxy groups, carboxylic acid groups, alkyl groups such as methyl, ethyl, propyl, butyl, pentyl, hexyl, octyl, dodecyl, octadecyl, and the like; aryl groups including phenyl and hydroxyphenyl; aralkyl groups such as benzyl groups attached via the aryl portion, such as in a 4-methylphenyl, 4-hydroxymethylphenyl, or 4-(2-hydroxyethyl)phenyl (also referred to as a phenethylalcohol) group, or the like, or aralkyl groups attached at the benzylic (alkyl) position such as found in a phenylmethyl or 4-hydroxyphenyl methyl group, at the 2-position in a phenethyl or 4-hydroxyphenethyl group, or the like. In an exemplary embodiment, the derivatized nanoparticle is graphene nanoparticles substituted with a benzyl, 4-hydroxybenzyl, phenethyl, 4-hydroxyphenethyl, 4-hydroxymethylphenyl, or 4-(2-hydroxyethyl)phenyl group or a combination comprising at least one of the foregoing groups.

In another embodiment, the nanoparticle can be further derivatized by grafting certain polymer chains to the functional groups. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly(ethylene glycol) and poly(propylene glycol), may be included by reaction with functional groups.

The functional groups of the derivatized nanoparticle may react directly with other components in the fiber reinforced polymer matrix composite, including reactive functional groups that may be present in the polymeric or monomeric constituents, leading to improved tethering/reaction of the derivatized nanoparticle with the polymeric matrix. Where the nanoparticle is a carbon-based nanoparticle such as graphene nanoparticles, a carbon nanotube, nanodiamond, or the like, the degree of derivatization for the nanoparticles can vary from 1 functional group for every 5 carbon centers to 1 functional group for every 100 carbon centers depending on the functional group.

The nanoparticles can also be blended in with other, more common filler particles such as carbon black, mica, clays such as e.g., montmorillonite clays, silicates, glass fiber, carbon fiber, and the like, and combinations thereof.

The nanoparticle may be formulated as a solution or dispersion and cast or coated, or may be mechanically dispersed in a polymer resin matrix. Blending and dispersion of the filler and the polymer resin may be accomplished by any suitable method, including methods such as, for example, extrusion, high shear mixing, rotational mixing, three roll milling, and the like.

Where thermosetting polymers are used, mixing the derivatized nanoparticle with a precursor to the thermosetting polymer may be accomplished by rotational mixing, or by a reactive injection molding-type process using two or more continuous feed streams, in which the derivatized nanoparticle may be included as a component of one of the feed streams (e.g., where the polymer is a polyurethane prepared using different feed streams, the derivatized nanoparticle is included in the diisocyanate or polyol, diamine, etc. streams, or in a separate stream as a suspension in a solvent). Mixing in such continuous feed systems is accomplished by the flow within the mixing zone at the point of introduction of the components. The derivatized nanoparticle may be mixed with the thermosetting polymer precursor(s) prior to a two-fold increase in the viscosity of the derivatized nanoparticle-polymer precursor mixture, where including the derivatized nanoparticle prior to the increase in viscosity ensures uniform dispersion of the derivatized nanoparticle.

The properties of the polymer composite may be adjusted by the selection of filler; for example, plate-like derivatized graphene nanoparticles may be arranged or assembled in the composite by taking advantage of the intrinsic surface properties of the graphene nanoparticles after exfoliation, in addition to the functional groups introduced by derivatization.

It has been found that homogeneous mixtures (i.e., composites) of derivatized nanoparticles with polymers have less variability in both tensile strength, modulus and elongation for any combination of nanoparticle and polymer, while improving mechanical properties for these composites. "Variability", as discussed herein, means the difference between the maximum and minimum in measured values for the different physical properties, for any given sample. In an embodiment, where a derivatized nanoparticle is homogeneously mixed with the polymer, the variability in physical properties, including tensile strength and percent elongation (% elongation), is less than the measurable variability of these properties obtained where a non-derivatized nanoparticle is used.

In an embodiment, the relative variability in physical properties (expressed as a percentage), such as for elongation and tensile strength, is less than or equal to ±2.0%, specifically less than or equal to ±1.5%, more specifically less than or equal to ±1.0% and still more specifically less than or equal to ±0.5%. In an embodiment, homogeneous mixing of the polymer and derivatized nanoparticle is carried out by a low shear mixing such as, for example, rotational mixing.

The polymer and the nanoparticles 28, including derivatized nanoparticles 29, may be formed into a dispersion to facilitate processing. The solvent may be an inorganic solvent such as water, including deionized water, or buffered or pH adjusted water, mineral acid, or a combination comprising at least one of the foregoing, or an organic solvent comprising an alkane, alcohol, ketone, oils, ethers, amides, sulfones, sulfoxides, or a combination comprising at least one of the foregoing. The polymer, derivatized nanoparticle, and any solvent may be combined by extrusion, high shear mixing, three-roll mixing, rotational mixing, or solution mixing.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant (s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

While one or more embodiments have been shown and described, modifications and substitutions may be made thereto without departing from the spirit and scope of the invention. Accordingly, it is to be understood that the present invention has been described by way of illustrations and not limitation.

The invention claimed is:

1. A downhole composite component, comprising:
a tubular member comprising a hollow cylindrical mandrel of a downhole plug, or a tubular housing of a downhole tool or component, the hollow cylindrical mandrel of the downhole plug, or the tubular housing, formed entirely from a fiber reinforced polymer matrix composite, the fiber reinforced polymer matrix composite comprising:
a polymer matrix, the polymer matrix having an unfilled matrix compressive modulus of elasticity;
a nanoparticle filler comprising a plurality of derivatized nanoparticles, the derivatized nanoparticles comprising a homogeneous mixture in the polymer matrix, the derivatized nanoparticles comprising a plurality of derivatized fullerene nanoparticles other than carbon nanotubes, graphene, graphene fiber, nanodiamond, silica, clay, mineral, or metal nanoparticles, or a combination thereof dispersed within the polymer matrix, the polymer matrix and dispersed nanoparticle filler having a filled matrix compressive modulus of elasticity, the filled matrix compressive modulus of elasticity being greater than the unfilled matrix compressive modulus of elasticity, and the derivatized nanoparticles providing a filled matrix compressive modulus of elasticity having a variability that is less than a variability of a filled matrix compressive modulus of elasticity using a mixture of non-derivatized nanoparticles in the polymer matrix; and
a plurality of reinforcing fibers, the plurality of reinforcing fibers embedded within the polymer matrix, the polymer matrix and plurality of reinforcing fibers having the form of the tubular member, the tubular member configured to receive a compressive stress, wherein the polymer matrix composite has a compressive strength and a bending strength configured for use as the hollow cylindrical mandrel or tubular housing.

2. The downhole composite component of claim 1, wherein the tubular member comprises a plug, the plug comprising a hollow cylindrical mandrel of a bridge plug, the mandrel having an outer cylindrical surface that is configured to slidably receive a tapered cone, the tapered cone comprising an inner cylindrical surface that is configured for sealable sliding engagement on the outer surface of the mandrel, the tapered cone having a tapered outer surface, the tapered outer surface configured to slidably receive a tapered inner surface of a slip, the slip comprising a complementary tapered inner surface that is configured for sealable sliding engagement on the tapered outer surface of the cone and a substantially cylindrical surface, the outer surface comprising a plurality of circumferentially extending teeth that are configured to sealably engage an inner surface of a tubular casing, wherein the tapered cone and slip are configured to provide a seal between the outer surface of the mandrel and the inner surface of the casing upon actuation of the bridge plug by application of pressure to a pressure actuation end of cone causing sliding axial movement of the tapered cone, and wherein upon actuation of the bridge plug, the mandrel, tapered cone and slip configured to receive axial and radial compressive stresses, and wherein an ultimate compressive stress of the fiber reinforced polymer matrix composite with the nanoparticle filler is greater than the same fiber reinforced polymer matrix composite without the filler.

3. The downhole component of claim 2, wherein the cone also comprises a second fiber reinforced polymer matrix composite, comprising:
a cone polymer matrix, the cone polymer matrix having an unfilled matrix compressive modulus of elasticity;
a cone nanoparticle filler comprising a plurality of derivatized nanoparticles other than silicon polymer or oligomer nanoparticles dispersed within the polymer matrix, the polymer matrix and dispersed nanoparticle filler having a filled matrix compressive modulus of elasticity, the filled matrix compressive modulus of elasticity greater than the unfilled matrix compressive modulus of elasticity; and
a plurality of cone reinforcing fibers, the plurality of cone reinforcing fibers embedded within the polymer matrix, the polymer matrix and plurality of cone reinforcing fibers having the form of the cone, and wherein the ultimate compressive stress of the second fiber reinforced polymer matrix composite with the nanoparticle filler is greater than the same fiber reinforced polymer matrix composite without the filler.

4. The downhole component of claim 3, wherein the cone polymer matrix comprises a thermoset or a thermoplastic polymer, or a combination thereof.

5. The downhole component of claim 3, wherein the plurality of cone reinforcing fibers comprise glass, carbon, mineral or polymer fibers, or a combination thereof.

6. The downhole component of claim 3 wherein the cone nanoparticle filler comprises a plurality of derivatized graphene, nanotube, fullerene, graphite, graphene fiber, nanodiamond, silica, clay, mineral, or metal nanoparticles, or a combination thereof.

7. The downhole component of claim 6, wherein the derivatized nanoparticles are derivatized to include a carboxy, epoxy, ether, ketone, amine, hydroxy, alkoxy, alkyl, aryl, aralkyl, alkaryl or lactone functional group, or a functionalized polymeric or oligomeric group, or a combination thereof.

8. The downhole component of claim 3, wherein the plurality of reinforcing fibers comprise a cloth, and wherein the cloth comprises a plurality of circumferentially wrapped cloth plies.

9. The downhole component of claim 3, wherein the plurality of reinforcing fibers comprise a tow, roving or other consolidated form, and wherein the tow, roving or other consolidated form comprises a circumferentially oriented tow, roving or other consolidated form as one ply and a non-circumferentially oriented tow, roving or other consolidated form as a second ply.

10. The downhole component of claim 3, wherein the plurality of reinforcing fibers comprise a tow, roving or other consolidated form as one ply, and a cloth as a second ply.

11. The downhole component of claim 3, wherein the plurality of reinforcing fibers comprise randomly oriented fibers.

12. The downhole composite component of claim 1, wherein the tubular member comprises a plug, the plug comprising a hollow cylindrical mandrel of a frac plug, the mandrel having a plug seat proximate an end of the mandrel, the plug seat configured for sealable engagement with a plug member upon actuation of the frac plug, and wherein the ultimate compressive stress of the fiber reinforced polymer matrix composite with the nanoparticle filler is greater than the same fiber reinforced polymer matrix composite without the filler.

13. The downhole component of claim 1, wherein the tubular housing comprises a cover that is configured to cover a portion of an axially-moveable downhole tool or component, and wherein the ultimate compressive stress of the fiber reinforced polymer matrix composite with the nanoparticle filler is greater than the same fiber reinforced polymer matrix composite without the filler.

14. The downhole component of claim 1, wherein the polymer matrix comprises a thermoset or a thermoplastic polymer, or a combination thereof.

15. The downhole component of claim 14, wherein the thermoset polymer comprises a phenolic, bismaleimide or an epoxy, or a combination thereof.

16. The downhole component of claim 14, wherein the thermoplastic polymer comprises polyetheretherketone.

17. The downhole component of claim 1, wherein the plurality of reinforcing fibers comprise glass, carbon, mineral, ceramic, metal or polymer fibers, or a combination thereof.

18. The downhole component of claim 1, wherein the plurality of reinforcing fibers are present in an amount, by volume fraction of the composite, of about 0.2 to about 0.8.

19. The downhole component of claim 18, wherein the plurality of reinforcing fibers are present in an amount, by volume fraction of the composite, of about 0.3 to about 0.6.

20. The downhole component of claim 1, wherein derivatized nanoparticles are derivatized to include a carboxy, epoxy, ether, ketone, amine, hydroxy, alkoxy, alkyl, aryl, aralkyl, alkaryl, or lactone functional group, or a functionalized polymeric or oligomeric group, or a combination thereof.

21. The downhole component of claim 20, wherein the derivatized nanoparticle is a derivatized graphene, the functional group comprises an alkyl, aryl, aralkyl, alkaryl, functionalized polymeric or oligomeric groups, or a combination thereof, and the functional groups are attached directly to the derivatized nanoparticle by a carbon-carbon bond without intervening heteroatoms; a carbon-oxygen bond; or a carbon-nitrogen bond.

22. The downhole component of claim 1, wherein an aspect ratio of the nanoparticles comprises about 0.001 to about 200.

23. The downhole component of claim 1, wherein the nanoparticle filler is present in an amount, by volume fraction of the composite, of about 0.005 to about 0.15.

24. The downhole component of claim 1, wherein the plurality of reinforcing fibers comprise a cloth, and wherein the cloth comprises a plurality of circumferentially wrapped cloth plies.

25. The downhole component of claim 24, wherein the cloth comprises a woven cloth.

26. The downhole component of claim 1, wherein the plurality of reinforcing fibers comprise a tow, roving or other consolidated form, and wherein the tow, roving or other consolidated form comprises a circumferentially oriented tow, roving or other consolidated form as one ply and a non-circumferentially oriented tow, roving or other consolidated form as a second ply.

27. The downhole component of claim 1, wherein the plurality of reinforcing fibers comprise a tow, roving or other consolidated form as one ply, and a cloth as a second ply.

28. The downhole component of claim 1, wherein the plurality of reinforcing fibers comprise randomly oriented fibers.

* * * * *